United States Patent
Cooper et al.

(10) Patent No.: US 10,100,873 B2
(45) Date of Patent: Oct. 16, 2018

(54) RADIALLY DEFLECTABLE BUSHING AND STEERING GEAR ASSEMBLY USING THE SAME

(71) Applicant: FORD GLOBAL TECHNOLOGIES, LLC, Dearborn, MI (US)

(72) Inventors: James Philip Cooper, Milford, MI (US); Jack E. Barry, Dearborn, MI (US); Joseph Washnock, Canton, MI (US); Dale Killins, Detroit, MI (US); Mark Eubank, Monroe, MI (US); Jennifer Laz, West Bloomfield, MI (US); John Crossman, Rockwood, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 139 days.

(21) Appl. No.: 14/565,132

(22) Filed: Dec. 9, 2014

(65) Prior Publication Data

US 2016/0160913 A1 Jun. 9, 2016

(51) Int. Cl.
*F16C 27/02* (2006.01)
*B62D 3/12* (2006.01)
(Continued)

(52) U.S. Cl.
CPC ............. *F16C 27/02* (2013.01); *B62D 3/12* (2013.01); *F16C 23/04* (2013.01); *F16C 29/001* (2013.01);
(Continued)

(58) Field of Classification Search
CPC ........ F16C 23/04; F16C 27/02; F16C 29/001; F16C 29/002; F16C 29/02; F16C 33/20; F16C 33/201; F16C 2208/20; F16C 2326/24; F16C 2208/02; B62D 3/12; B62D 1/20; F16H 19/04; Y10T 403/7047; Y10T 403/7061; F16F 3/02; F16F 1/34
(Continued)

(56) References Cited

U.S. PATENT DOCUMENTS 3,601,459 A * 8/1971 Cutting ................. F16C 27/063
384/100
4,286,894 A * 9/1981 Rongley ................. F16C 27/04
403/372
(Continued)

FOREIGN PATENT DOCUMENTS

CN 103029745 A 4/2013
CN 203332201 U 12/2013
(Continued)

*Primary Examiner* — Laura Freedman
(74) *Attorney, Agent, or Firm* — Jones Robb, PLLC; Frank MacKenzie

(57) ABSTRACT

A bushing is provided for adjusting to differences in diameter between concentric elements of an assembly. The bushing may be provided with a plurality of leaf springs coupled to one another to form parts of a wall. The bushing wall may have a first contact face and a second contact face opposite the first contact face. The bushing wall may also be configured to be positioned in a generally annular shape. Each of the leaf springs forming part of the bushing wall may be radially deflectable relative to each of the other leaf springs in order to self-align the bushing by the resilient response of each leaf spring.

36 Claims, 7 Drawing Sheets

(51) Int. Cl.
*F16C 23/04* (2006.01)
*F16C 29/02* (2006.01)
*F16C 33/20* (2006.01)
*F16C 29/00* (2006.01)

(52) U.S. Cl.
CPC ............ *F16C 29/002* (2013.01); *F16C 29/02* (2013.01); *F16C 33/20* (2013.01); *F16C 33/201* (2013.01); *F16C 2208/02* (2013.01); *F16C 2208/20* (2013.01); *F16C 2326/24* (2013.01)

(58) Field of Classification Search
USPC ........................................................ 267/161
See application file for complete search history.

(56) References Cited

U.S. PATENT DOCUMENTS

| | | | | |
|---|---|---|---|---|
| 4,828,423 A * | 5/1989 | Cramer, Jr. | ........... | F16D 1/0835 403/326 |
| 5,345,679 A * | 9/1994 | Lennon | ................... | B29C 53/06 29/441.1 |
| 5,383,811 A * | 1/1995 | Campbell | .............. | B62D 1/185 384/42 |
| 5,460,574 A | 10/1995 | Hobaugh | | |
| 5,611,628 A * | 3/1997 | Brouwer | ................ | F16C 17/08 384/220 |
| 5,836,699 A * | 11/1998 | Back | ....................... | F16C 17/18 384/276 |
| 5,880,043 A * | 3/1999 | Lorenz | ................... | B32B 27/04 384/300 |
| 5,902,049 A * | 5/1999 | Heshmat | ............... | F16C 17/024 384/106 |
| 5,964,536 A * | 10/1999 | Kinoshita | ............... | F16C 33/20 384/441 |
| 6,149,526 A * | 11/2000 | Boersma | ................ | B62D 1/185 403/225 |
| 6,485,180 B2 * | 11/2002 | Mena | ....................... | B62D 3/12 384/215 |
| 7,223,020 B2 * | 5/2007 | Bauer | .................... | F16C 27/04 267/160 |
| 7,367,421 B2 * | 5/2008 | Saito | ........................ | B62D 3/12 180/426 |
| 7,665,747 B2 | 2/2010 | Arlt | | |
| 7,850,389 B2 * | 12/2010 | Hanrahan | ................ | F16C 27/00 360/265.6 |
| 7,926,378 B2 * | 4/2011 | Saito | ......................... | B62D 3/12 74/388 PS |
| 8,061,693 B2 | 11/2011 | Neureder | | |
| 8,205,515 B2 | 6/2012 | Robertson et al. | | |
| 8,272,785 B2 * | 9/2012 | Hirose | ..................... | B62D 3/12 384/215 |
| 8,388,455 B2 | 3/2013 | Eltner | | |
| 8,418,583 B2 * | 4/2013 | Oki | ........................... | B62D 3/12 384/276 |
| 8,684,624 B2 * | 4/2014 | Slayne | ................... | F16D 1/0835 403/365 |
| 8,863,599 B2 * | 10/2014 | Crossman | .............. | B62D 3/123 74/388 PS |
| 8,893,847 B2 * | 11/2014 | Imanishi | ............... | B62D 5/0409 180/443 |
| 9,022,683 B2 * | 5/2015 | Nias | ......................... | F16C 11/04 360/265.2 |
| 9,709,096 B2 * | 7/2017 | Varnoux | ............... | F16C 33/416 |
| 2005/0070365 A1 | 3/2005 | Riefe et al. | | |
| 2008/0088104 A1 | 4/2008 | Arlt | | |
| 2009/0256341 A1 * | 10/2009 | Okada | .................... | B62B 1/181 280/775 |
| 2011/0076096 A1 * | 3/2011 | Slayne | .................... | F16C 27/02 403/372 |
| 2011/0219907 A1 | 9/2011 | Rietzler | | |
| 2013/0112024 A1 * | 5/2013 | Crossman | .............. | B62D 3/123 74/422 |
| 2013/0118291 A1 | 5/2013 | Heintschel et al. | | |
| 2014/0018177 A1 | 1/2014 | Drechsler | | |
| 2014/0147199 A1 * | 5/2014 | Tajima | .................... | F16C 27/02 403/371 |
| 2016/0059883 A1 * | 3/2016 | Mizutani | ................. | B62D 3/12 74/422 |
| 2016/0318545 A1 * | 11/2016 | Uchihara | .............. | B62D 5/0409 |

FOREIGN PATENT DOCUMENTS

| | | |
|---|---|---|
| EP | 1 911 658 A1 | 4/2008 |
| JP | 2004217048 A * | 8/2004 |
| JP | 2010195211 A * | 9/2010 |
| KR | 10-2010-0031947 | 3/2010 |

* cited by examiner

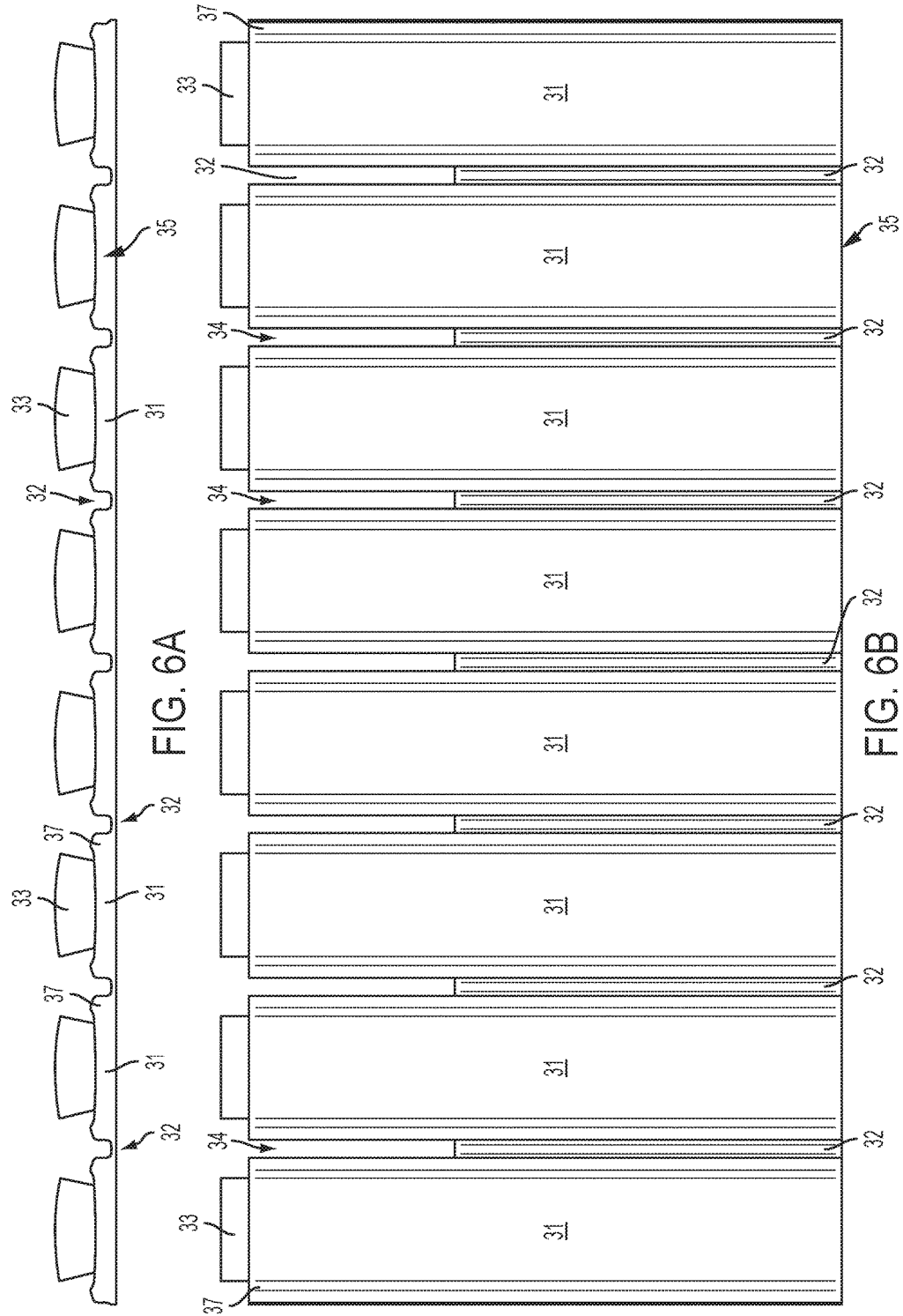

RADIALLY DEFLECTABLE BUSHING AND STEERING GEAR ASSEMBLY USING THE SAME

TECHNICAL FIELD

The present disclosure relates generally to a bushing for use in assemblies such as steering gear assemblies, and more particularly, steering gear assemblies for use in motor vehicles.

BACKGROUND

Bushings may be used in steering gear assemblies between a steering gear rack and a steering gear housing in order to provide surfaces for relative rotation. Conventional bushings, when used in such a setting, may shift in alignment during loading and may suffer from radial lash and increased friction. In such assemblies, it may be desirable to allow the rack and the housing to have variation in a diametrical dimension and to allow for rotational movement of the rack within the housing in an assembled condition while minimizing frictional resistance and maintaining a relative position of the rack and housing with respect to one another. In particular, it may be desirable to provide a bushing having positive load carrying capability and self-centering characteristics that address dimensional variation.

SUMMARY

In accordance with the various exemplary embodiments, the present disclosure provides a bushing, assemblies comprising a bushing, and methods of manufacturing a bushing.

In accordance with one aspect of the present disclosure, a bushing comprises a plurality of leaf springs coupled to one another to form a bushing wall, the bushing wall having a first contact face and a second contact face opposite the first contact face. The bushing wall is configured to be positioned in a generally annular shape. Each of the leaf springs is radially deflectable relative to each of the others of the plurality of leaf springs to self-align the bushing.

In accordance with another aspect of the present disclosure, a steering gear assembly comprises a steering gear housing, a steering gear rack positioned at least partially within the steering gear housing, and a bushing. The bushing comprises a plurality of leaf springs coupled to one another to form a bushing wall. Each of the leaf springs are deflectable relative to the plurality of leaf springs to self-align the bushing. The bushing is positioned between the housing and the rack such that each of the plurality of leaf springs is at least partially in contact with at least one of an interior surface of the steering gear housing and an exterior surface of the steering gear rack.

In accordance with a further aspect of the present disclosure, a bushing comprises a plurality of leaf springs coupled to one another to form a bushing wall. The wall is movable between a generally planar configuration and a generally cylindrical configuration. Each of the plurality of leaf springs is radially movable relative to a longitudinal axis of the generally cylindrical configuration of the bushing wall.

In accordance with yet another aspect of the present disclosure, a method of assembling a steering gear assembly is provided. The method comprises positioning a bushing between a steering gear housing and a steering gear rack. Positioning the bushing comprises moving a wall of the bushing between a planar configuration and a generally cylindrical configuration.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages of the present disclosure will be apparent from the following detailed description of exemplary embodiments consistent therewith, which description should be considered with reference to the accompanying drawings, wherein:

FIG. 6A is an end view of the bushing of FIGS. 3A and 3B with the bushing wall in a generally planar configuration; and FIG. 6B is a top view of the generally planar configuration of the bushing wall of FIG. 6A.

Figure 1A:
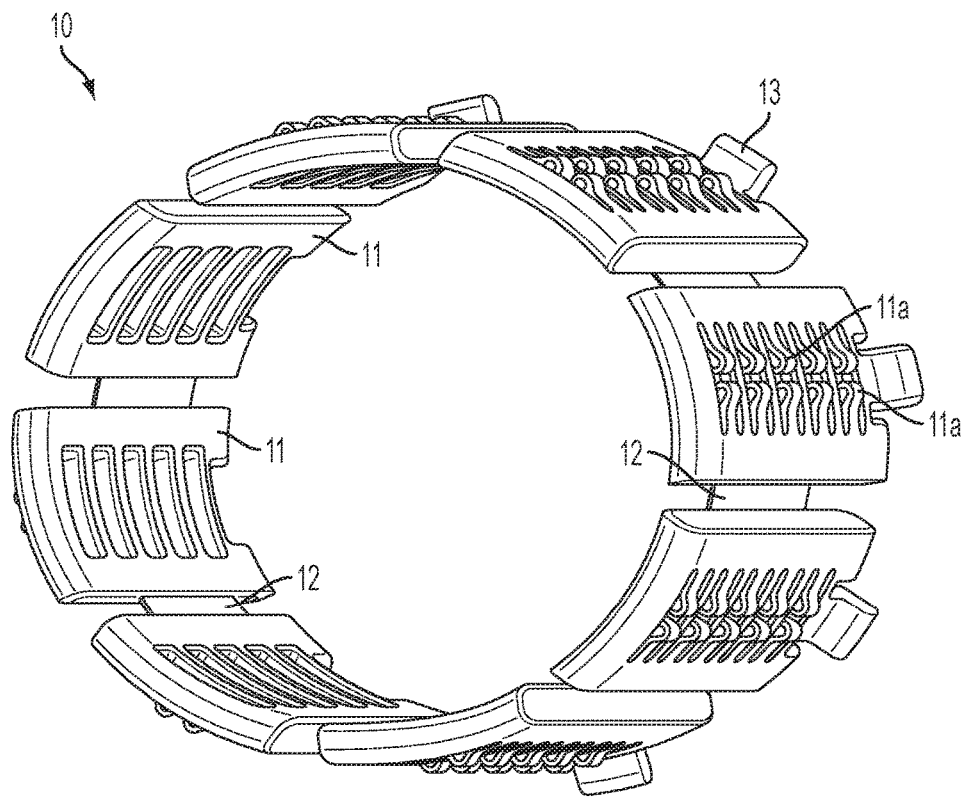
FIG. 1A shows a perspective end view of a bushing according to a first exemplary embodiment of the present disclosure.

Although the following detailed description makes reference to exemplary embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The present disclosure is directed to a bushing for use in, for example, steering gear assemblies between a steering gear rack and a steering gear housing to maintain a relative position of the rack and housing with respect to one another. The bushing is configured to permit relative movement between the steering gear rack and a steering gear housing in a diametrical dimension. Additionally, the bushing allows rotational movement of the rack within the housing in an assembled condition and may minimize frictional resistance.

In accordance with one aspect of the present teachings, a bushing as disclosed herein is self-aligning. The bushing comprises a bushing wall formed from a plurality of panels. Each panel comprises one or more leaf springs. The panels formed of leaf springs may be coupled directly or indirectly to one another to form the bushing wall. The bushing wall may have a first contact face and a second contact face that is located opposite to the first contact face. Each contact face is configured to contact, for example, a surface of one of the steering gear rack and the steering gear housing (i.e., a contact surface). The amount of contact between a contact face and a respective contact surface may vary around a circumference of the bushing. The contact face may include portions that are biased toward or away from a contact surface of the steering gear rack and/or steering gear housing when in an installed state. Each of the plurality of leaf springs may be individually deflectable relative to the remainder of the plurality of leaf springs, or with respect to other features of the bushing, in order to self-align the bushing between elements with which the bushing is intended to be used.

The bushing wall may have a generally annular or ring-like shape. Additionally or alternatively, in accordance with one exemplary embodiment of the disclosure, the bushing wall may be molded or otherwise formed in a generally planar configuration and moved into the generally annular shape during installation or positioning between elements such as a rack and a housing.

Depending upon the environment in which the bushing is to be used and the manufacturing constraints, for example, the bushing may take a number of configurations during the manufacturing process and the assembly process. In one non-limiting example, it may be desirable to configure the bushing in a generally planar configuration prior to assembly, and in a generally cylindrical or annular configuration during and after assembly.

The leaf springs may be formed as wall portions that vary in a radial dimension with respect to an average radius of the bushing when formed in the generally annular shape. Similarly, when formed in the generally planar shape, the leaf spring wall portions may be formed at selected portions to protrude away in at least one direction from a plane formed between bushing ends. When formed in the generally annular shape, each of the plurality of leaf springs may be radially deflectable with respect to a longitudinal axis of the generally annular shape.

In an exemplary embodiment, a load carrying bushing may have at least one axial slot at a first axial end of the bushing extending toward a second axial end of the bushing. In another exemplary embodiment there may be a gap that extends axially between circumferential ends of the bushing wall when the bushing is in the generally annular shape. However, the at least one axial slot may be configured separately from the gap between circumferential ends. The axial slots may serve to stabilize the bushing in a steering assembly. In one example, the at least one axial slot may be formed as a plurality of axial slots that extend only part of the way through the bushing wall in the axial direction. The plurality of axial slots may allow for additional radial deflection of the bushing wall in the sections located between adjacent axial slots. The additional movement may enable desirable radial deflection of wall portions during installation of the bushing into an assembly. For example, when the bushing is inserted into a housing or onto a rack, the sections of bushing wall located between adjacent axial slots may flex radially in an inward or outward direction, in order to accommodate the dimensions of the radial flange diameter within the housing or around the rack.

In various exemplary embodiments, the housing or on the rack may be provided with corresponding features to engage with features of the bushing. For example, either the housing or the rack may have a circumferential groove formed on one or more surfaces, and into which a radial flange of the bushing may extend to engage the bushing with the housing or the rack having the groove. This engagement may occur during installation of the bushing, to secure and maintain a relative axial position between the bushing and at least one of the assembly elements (e.g., the housing) during the further assembly of one or more other assembly elements (e.g., the rack).

As will be understood by those skilled in the art, the bushing may be formed out of a moldable material such as a thermoplastic. Such a material may allow the bushing to be manufactured by a process such as injection molding, as also will be understood by those skilled in the art. However, in various exemplary embodiments of the present disclosure, the bushing may be manufactured in a shape that is generally planar, as noted above. The thermoplastic material from which the bushing is formed may provide the bushing with sufficient flexibility to be reconfigured from the initial generally planar shape into a generally annular shape. Further, the thermoplastic material may be selected to provide a low coefficient of friction between the bushing and the other assembly elements with which the bushing makes contact. The low coefficient of friction may allow for improved relative rotation of the assembly elements with a minimal amount of rotational resistance. The material used also may be selected to provide deflection or bias of the leaf spring portions/panels of the bushing. In addition, as will be understood by those skilled in the art, the material used to form the bushing may be selected to minimize creep and to maximize yield strength. As will be understood by those skilled in the art, the selection of a material to balance creep and yield strength may depend upon the particular intended application of the bushing. Additionally, the material may be selected to have consistent performance across a broad temperature range, for example, between about −40° C. and about 135° C.

In an exemplary embodiment, the thermoplastic material of the bushing also may include natural or synthetic fibers to increase strength of the bushing in at least one direction, as determined by the orientation of the fibers. In one non-limiting example, a natural fiber may be a carbon fiber, and in another non-limiting example, a synthetic fiber may be a para-aramid synthetic fiber such as Kevlar® fiber. The fiber may be embedded within the thermoplastic material of the bushing at one or more selected fiber orientations, in order to form a composite material having desired strength and flexibility in at least one of a radial, axial, or circumferential dimension. Examples of suitable materials include nylon 6 or a nylon resin such as Zytel®.

Figure 1B:
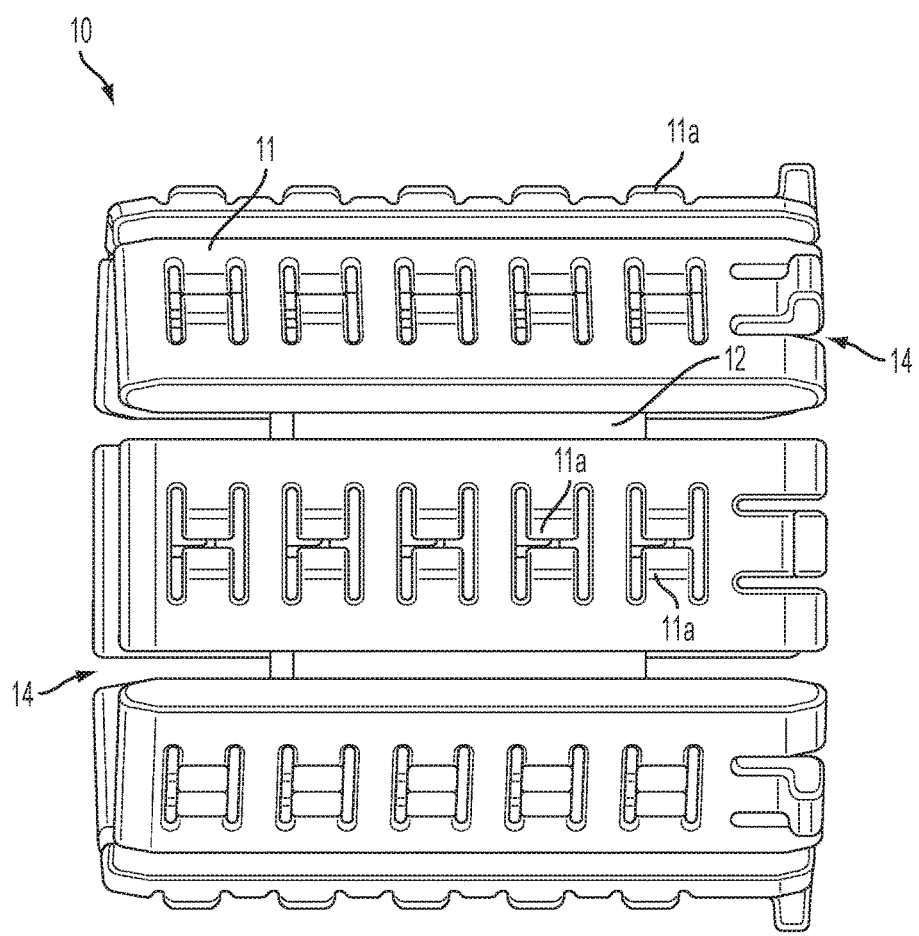
FIG. 1B shows a perspective side view of the bushing of FIG. 1A.

Turning now to the drawings, FIGS. 1A and 1B illustrate a bushing 10 according to a first exemplary embodiment of the present disclosure. The bushing 10 may include a plurality of leaf springs 11a that are coupled to one another (or otherwise formed together) to form panels 11 of a bushing wall. In a first exemplary embodiment, the wall may be annular in shape, as shown in FIG. 1A, and comprised of panels 11 and connecting elements or intermediary wall portions 12. In one exemplary embodiment, connecting elements 12 form hinges between panels 11. Each leaf spring 11a may have a generally rectangular shape when viewed from the side along a radial direction, as shown in FIG. 1B. The leaf springs 11a may be formed as protrusions extending away from the bushing wall in a radial direction, such that the leaf springs may allow for deflection of the wall in the radial direction. The leaf springs 11a may be positioned adjacent one another to form parts of the wall panel 11, and each wall panel 11 may extend in an axial direction of the annular shape, as shown.

FIG. 1B shows a plurality of wall panels 11, each wall panel having a plurality of leaf springs 11a, with each leaf spring 11a extending radially outwardly from the wall and arranged in an axial direction along each axially formed wall panel. As shown in FIG. 1B, the leaf springs 11a may be adjacent to one another within a panel 11, spaced along an axial length of the panel (i.e., along a longitudinal or central axis of the bushing 10). Additionally, each leaf spring 11a may function independently of the remaining leaf springs 11a in a given panel 11, as well as independently of leaf springs 11a in other panels 11 in the bushing. Each of the wall panels 11 may be coupled, directly or indirectly, to at least one adjacent wall panel 11. The connection between adjacent wall panels may be formed by intermediary wall portions 12, which also form part of the bushing wall. In one exemplary embodiment, intermediary wall portions 12 may be hinge elements that permit each panel 11 to move relative to the panels 11 and hinge elements 12 which together form bushing 10. Thus, the axially extending wall panels 11, each comprising a plurality of leaf springs 11a, may be connected to one another by the intermediary wall portions 12, in order to circumferentially connect the axially extending wall panels and thereby form the generally annular wall of the bushing. As shown, the intermediary wall portions 12 may have a different length, a different thickness, a different width, and a different shape than the panels 11. For example, as shown in FIG. 1B, intermediary wall portions may have an axial length that is shorter than an axial length of panels 11. Additionally or alternatively, the intermediary wall portions 12 may have one or more of a length, a thickness, a width, and a shape that is the same as or similar to that of the panels 11. Additionally, intermediary wall portions 12 may be positioned at an inner surface/inner diameter of the bushing, to allow displacement of biasing of panels 11 and/or leaf springs 11a in a radially outward direction, or alternatively, may be positioned to bias panels or leaf springs in an radially inward direction. As shown in FIGS. 1A and 1B, each panel 11 may be spaced apart from a nearby or adjacent panel 11. These axial spaces permit the radial movement of each panel 11 independent of and relative to all of the other panels 11 of the bushing wall. This particular construction allows the bushing to be self-aligning (self-centering) and to permit relative movement of between the steering gear rack and the steering gear housing in a diametrical dimension.

In an exemplary embodiment, a first axial end of the bushing 10 may include a flange 13. Flange 13 may be formed as one or more radial protrusions extending outwardly away from the bushing wall in a direction generally perpendicular to a base of the bushing wall. Additionally and/or alternatively, the first axial end of the bushing may include one or more axial slots 14. As shown in FIGS. 1A and 1B, axial slots 14 may be formed in each panel 11 and extending axially toward a second end of the bushing. The axial slots 14 may be located between adjacent protrusions of the radial flange, and in the exemplary embodiment, the axial slots 14 do not extend entirely through the bushing wall in the axial direction. The axial slots 14 may, for example, permit additional flexure of the panels of the bushing wall, which may be desirable during installation of the bushing, or when load is applied to the bushing 10 during its use. The axial slots also may, for example, stabilize the bushing when used in, for example, a steering assembly.

Figure 2A:
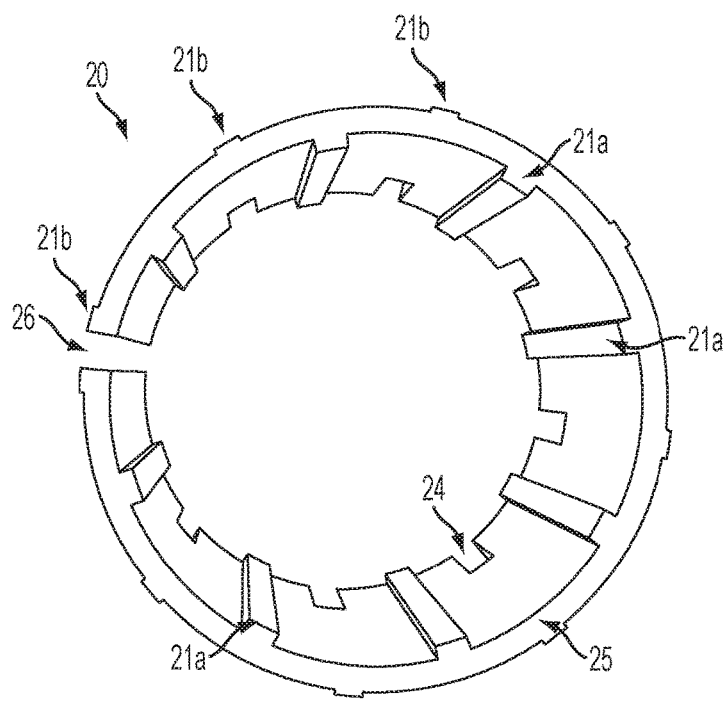
FIG. 2A shows a perspective end view of a bushing according to a second exemplary embodiment of the present disclosure.
Figure 2B:
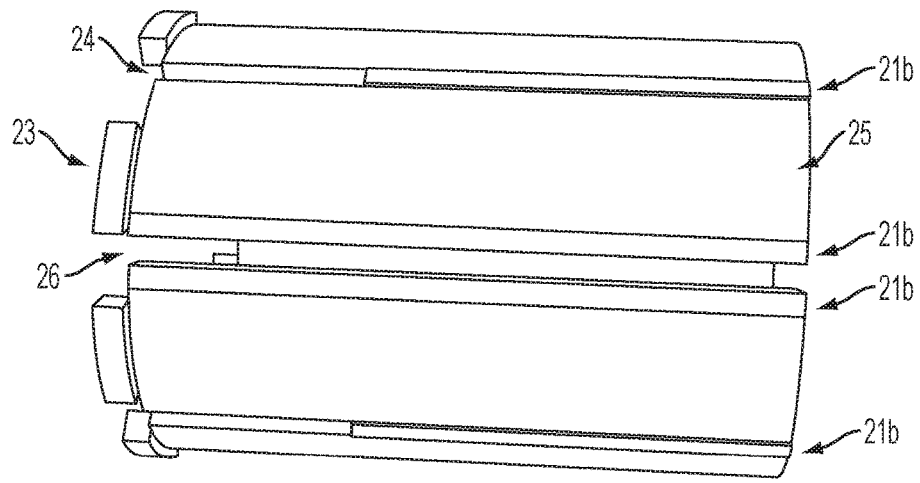
FIG. 2B shows a perspective side view of the bushing of FIG. 2A.

In accordance with the present teachings, a second exemplary embodiment of a bushing 20 is shown in FIGS. 2A and 2B. This second exemplary embodiment of the bushing 20 includes a plurality of leaf springs 21 in the form of axially-extending beams. As shown in FIGS. 2A and 2B, the axially-extending beams that form leaf springs 21 form inner leaf springs 21a, which protrude from the inner surface of a bushing wall 25, and external leaf springs 21b, which protrude from the outer surface of the bushing wall 25. Alternatively, it is contemplated that in certain embodiments, leaf springs 21, in the form of axially-extending beams, may be provided on either an outer surface of the bushing wall 25 or the inner surface of the bushing wall 25. In one exemplary embodiment, the bushing wall, including axially-extending beams 21a on the inner surface of the bushing wall and axially-extending beams 21b on the outer surface of the bushing wall, may be placed into contact with inner and outer concentric assembly elements with which the bushing 20 is to be used. This contact may cause sections of the bushing wall to flex inwardly or outwardly, depending upon the relative dimensions of the elements with respect to the bushing 20 and the type and amount of loading of the bushing. For example, loading of the bushing 20 may cause the flexing of leaf springs 21a and 21b and result in the bushing wall 25 taking on a generally sinusoidal shape around its circumference (i.e., when viewed from one axial end of the bushing). That is, outwardly protruding axially-extending beams 21b may alternate with inwardly protruding axially-extending beams 21a, in a way that causes a flexure of the bushing wall, and a corresponding resilient response to deflection of the bushing wall 25. For example, inwardly protruding axially-extending beams 21a may cause the bushing wall to flex radially outward and outwardly protruding axially-extending beams 21b may cause the bushing wall to flex radially inwardly. Thus, the axially-extending beams 21a, 21b create a series of leaf springs 21a, 21b in portions of the bushing wall 25, and in use, these leaf springs 21a, 21b may produce similar flexure at bushing wall portions where protrusions are located, as discussed above with respect to the leaf springs 11a in the embodiment of FIGS. 1A-1B.

In accordance with the present teaching and as shown in FIGS. 2A-2B, a flange 23 may be formed at a first axial end of the bushing 20. The flange 23 may be formed as one or more radial protrusions extending away from the bushing wall in a radial direction. The flange 23 may be used for positioning and retention of the bushing 20 within a steering assembly.

The first axial end of the bushing 20 may also include axial slots 24 extending axially toward a second end of the bushing. The axial slots 24 may be located between adjacent protrusions of the radial flange 23, and do not extend through the entire length of the bushing wall in the axial direction. The axial slots 24 may permit additional flexure of the bushing wall, which may be desirable during installation of the bushing 20 or when load is applied to the bushing 20 during use. In addition, the axial slots 24 may facilitate the independent flexure of one leaf spring 21 relative to another leaf spring 21. That is, the particular pattern and position of the axial slots may permit each leaf spring 21 to move and function independently of other leaf springs 21 in the bushing 20. This particular construction allows the bushing 20 to be self-aligning (self-centering) and to permit relative movement of between the steering gear rack and the steering gear housing in a diametrical dimension.

Due to an exemplary manufacturing process in which the bushing is formed in an initial, generally planar shape, then reconfigured into the generally annular shape, when the generally planar shape is formed into a circumferential and/or annular shape, an axial gap 26 is formed when the axial ends of the bushing wall 25 are positioned adjacent or near to one another. Additionally and/or alternatively, it is possible to connect the ends of the bushing wall to one another during installation, or the bushing may be formed by another process such that the bushing is annular in shape and an axial gap is not provided.

Figure 3A:
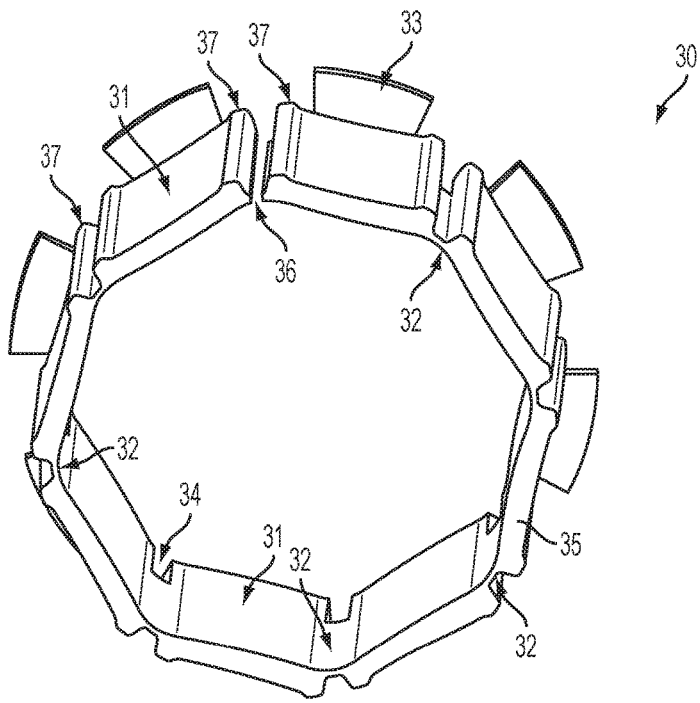
FIG. 3A shows a perspective end view of a bushing according to a third exemplary embodiment of the present disclosure.
Figure 3B:
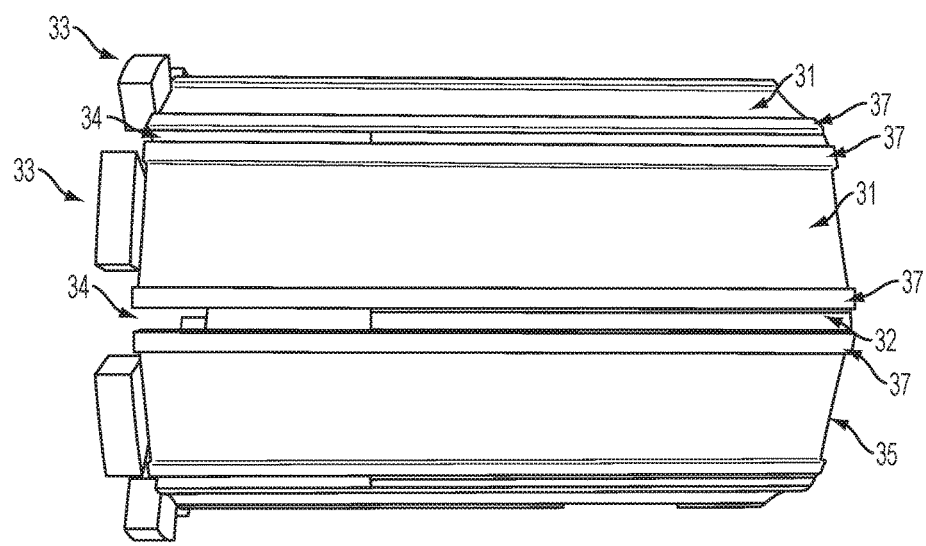
FIG. 3B shows a perspective side view of the bushing of FIG. 3A.

In accordance with the present teachings, a third exemplary embodiment of a bushing 30 is shown in FIGS. 3A and 3B. Bushing 30 may include a plurality of panels 31. Each panel may be a leaf spring 31. Thus, each leaf spring 31 may form an individual panel of the bushing wall 35. As shown in FIG. 3A, each leaf spring 31 may include a pad 37 on each side of the panel, the pads 37 each having a thickness greater than that of the panel. Thus, during use of the bushing 30, the pads 37 are configured to contact an element in which the bushing is placed, for example, an interior surface of a steering gear housing, and react on that contact surface, engaging or actuating the leaf spring 31. Each leaf spring 31 may be connected to another leaf spring 31 of bushing 30 via an intermediate wall or connection portion 32. In accordance with one exemplary embodiment, intermediate or connecting wall portions 32 are formed to act as hinge elements and are positioned between leaf springs 31 to permit each leaf spring 31 to flex independently within bushing 30. Intermediate or connecting wall portions 32 in the form of hinge elements may form recessed portions of the bushing wall 35, having a thickness that is less than pads 37 and less than leaf springs 31. As these hinge elements are recessed, they may not contact surface(s) of other assembly elements during use of the bushing. As shown, the intermediate or connecting wall portions 32 may have a different length, a different thickness, a different width, and a different shape than the leaf springs 31. For example, as shown in FIG. 3B, intermediate or connecting wall portions may have an axial length that is shorter than an axial length of leaf springs 31. Additionally or alternatively, the intermediate or connecting wall portions 32 may have one or more of a length, a thickness, a width, and a shape that is the same as or similar to that of the leaf springs 31. Additionally, intermediate or connecting wall portions 32 may be positioned at an inner surface/inner diameter of the bushing, to allow displacement of portions of leaf springs 31 in a radially inward direction. Additionally or alternatively, intermediate or connecting wall portions 32 may be positioned to bias leaf springs in a radially outward direction.

Intermediate or connecting wall portions 32 may be biased in a particular radial dimension to create curvatures of the bushing 30 and to permit independent function of the leaf springs 31. That is, the intermediate or connecting wall portions 32 may serve to isolate each leaf spring 31 from the other leaf springs 31, such that each leaf spring can move and function independently of the remaining leaf springs 31, at least in a radial direction, based on the manner in which each leaf spring 31 of the bushing 30 is loaded.

Together, leaf springs 31 and intermediate or connecting wall portions 32 form a bushing wall 35 that may include radially inwardly and/or radially outwardly curved portions. As will be understood by those skilled in the art, the amount of curvature in each leaf spring 31 and/or intermediate or connecting wall portions 12, is application specific and depends upon, for example, the type of loading of the bushing and the type of material used for the bushing. For example, the greater (larger) the curvature of the leaf springs, the larger (more) displacement that can be tolerated by the bushing in the steering assembly. However, the amount of curvature may be limited, for example, by the yield strength and creep of the material used to form the bushing.

The radially inward and outward curved portions of the bushing wall may be placed in contact with inner and outer concentric assembly elements with which the bushing 30 may be used. This contact may cause the curved portions of the wall to flex inwardly or outwardly depending upon relative dimensions of the other assembly elements with respect to the bushing 30. Outwardly extending curved portions may alternate with inwardly extending curved portions, in a manner that causes a resilient response to radial deflection of the bushing wall. Thus, the variation or undulation of the bushing wall of the second embodiment may result in a series of leaf springs 31 forming portions of the bushing. These leaf springs 31 may produce a similar effect to the axially-extending beams forming leaf springs 21a, 21b of the second exemplary embodiment.

As shown in FIGS. 3A and 3B, a first axial end of the bushing 30 may include a radial flange 33 formed as one or more radial protrusions extending outwardly away from the bushing wall 35. The first axial end of the bushing 30 may also include axial slots 34 extending axially toward a second end of the bushing. The axial slots 34 may be located between adjacent protrusions of the radial flange 33 and do not extend entirely through the bushing wall 35 in the axial direction. The axial slots 34 may permit additional flexure of the bushing wall 35, which may be desirable during installation of the bushing 30, or when load is applied to the bushing 30 during use. In addition, the axial slots 34 may facilitate the independent flexure of one leaf spring 31 relative to another leaf spring 31. That is, the particular pattern and position of the axial slots may permit each leaf spring 31 to move and function independently of other leaf springs 31 in the bushing 30. This particular construction allows the bushing 30 to be self-aligning (self-centering) and to permit relative movement of between the steering gear rack and the steering gear housing in a diametrical dimension.

Additionally, as described above with respect to the exemplary embodiment of FIGS. 2A-2B, an axial gap 36 may be formed when the axial ends of the bushing wall 35 are positioned adjacent or near to one another. In particular, due to an exemplary manufacturing process in which the bushing is formed in an initial, generally planar (or flat) shape, when the generally planar shape is formed into a circumferential and/or annular shape, an axial gap 36 is formed when the axial ends of the bushing wall 35 are positioned adjacent or near to one another. Additionally and/or alternatively, it is possible to connect the ends of the bushing wall to one another during installation, or the bushing may be formed by another process such that the bushing is annular in shape and an axial gap is not provided. FIGS. 6A and 6B illustrate the bearing 30 of FIGS. 3A and 3B with the bearing wall 35 in a generally planar configuration. FIGS. 3A and 3B illustrate the bearing 30 in a generally annular shape, in which either the bearing wall 35, formed in a planar shape during manufacturing, has been moved to form a generally annular shape, or the bearing wall 35 was formed in the generally annular shape during manufacturing.

Figure 4A:
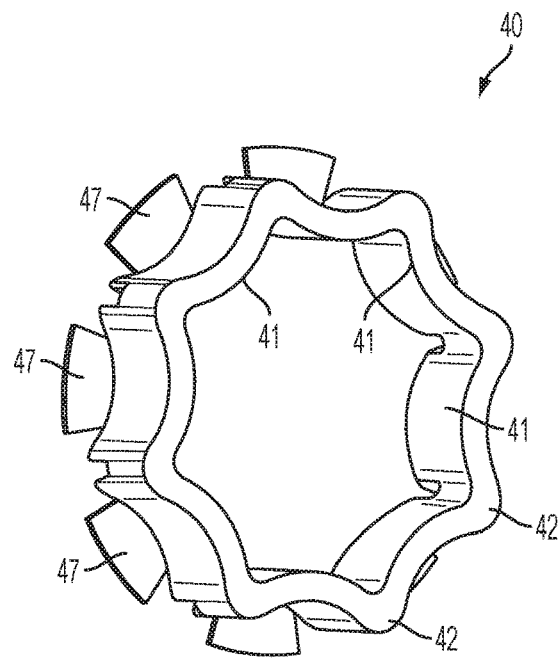
FIG. 4A shows a perspective end view of a bushing according to a fourth exemplary embodiment of the present disclosure.
Figure 4B:
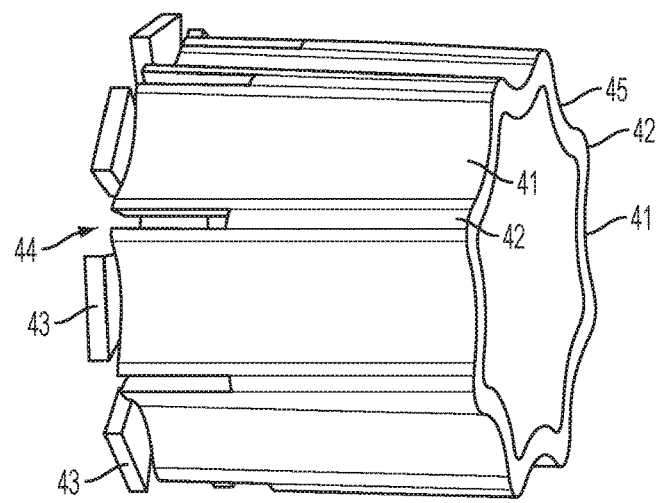
FIG. 4B shows a perspective side view of the bushing of FIG. 4A.

A fourth exemplary embodiment of a bushing 40 is shown in FIGS. 4A and 4B. In accordance with the present disclosure, bushing 40 may include a plurality of leaf springs 41. Leaf springs 41 may be formed by variation or undulation of a bushing wall radially inwardly and radially outwardly in an alternating manner with respect to an average radial dimension of the bushing 40 when it is formed in the annular shape. The inward and outward variation of the bushing wall may form leaf springs 41. In particular, as shown in FIGS. 4A and 4B, leaf springs 41 may be biased in a radially inward direction, toward a central axis of the bushing 40, and may be connected to one another by intermediate or connecting wall portions 42 of bushing 40. As with the embodiment described above with regard to FIGS. 3A and 3B, intermediate or connecting wall portions 42 may be formed by recessed hinge elements. As shown, the intermediate or connecting wall portions 42 may have a different length, a different thickness, a different width, and a different shape than the leaf springs 41. For example, as shown in FIG. 4B, intermediary wall portions may have an axial length that is shorter than an axial length of leaf springs 41. Additionally or alternatively, the intermediate or connecting wall portions 42 may have one or more of a length, a thickness, a width, and a shape that is the same as or similar to that of the leaf springs 41. Additionally, intermediate or connecting wall portions 42 may be positioned at an inner surface/inner diameter of the bushing, to allow displacement of portions of leaf springs 41 in a radially inward direction. Additionally or alternatively, intermediary wall portions 42 may be positioned to bias leaf springs in a radially outward direction. In the exemplary embodiment of FIG. 4A, intermediate or connecting wall portions 42 may be biased in a radially outward direction, away from a central axis of the bushing 40.

Intermediate or connecting wall portions 42 may be biased in a particular radial dimension to create curvatures of the bushing 40 and to permit independent function of the leaf springs 41. That is, the intermediate or connecting wall portions 42 may serve to isolate each leaf spring 41 from the other leaf springs 41, such that each leaf spring 41 can move and function independently of the remaining leaf springs 41, at least in a radial direction, based on the manner in which each leaf spring 41 of the bushing 40 is loaded.

In this manner, the alternating pattern of leaf springs 41 and intermediate or connecting wall portions 42 of bushing 40 form an undulating wall 45 of the bushing. That is, together, leaf springs 41 and intermediate or connecting wall portions 42 form a bushing wall 45 having radially inwardly and radially outwardly curved portions. The degree of bushing wall curvature may, in various exemplary embodiments discussed through this disclosure, be selected based on relative dimensions of assembly elements, or other features of an environment in which the bushing it to be used. In particular, as will be understood by those skilled in the art, the amount of curvature in each leaf spring 41 and/or intermediate or connecting wall portions 42, is application specific and depends upon, for example, the type of loading of the bushing and the type of material used for the bushing. For example, the greater (larger) the curvature of the leaf springs, the larger (more) displacement that can be tolerated by the bushing in the steering assembly. However, the amount of curvature may be limited, for example, by the yield strength and creep of the material used to form the bushing.

The radially inward and outward curved portions of the bushing wall may be placed in contact with inner and outer concentric assembly elements with which the bushing 40 is to be used. This contact may cause the curved portions of the wall to flex inwardly or outwardly depending upon the relative dimensions of the assembly elements with respect to the bushing 40. Outwardly extending curved portions of the bushing wall may alternate with inwardly extending curved portions of the bushing wall in a manner that causes a resilient response to radial deflection of the bushing wall. Thus, the variation or undulation of the bushing wall of bushing 40 creates a series of leaf springs 41. An amount of the resilient response may be related to a degree of curvature of the bushing wall at each of the leaf springs 41, as well as a type of material used for the manufacture of the bushing, and an amount of radial deflection of each leaf spring 41.

At a first axial end of the bushing 40 according to the exemplary embodiment, there may be a radially-extending flange 43 formed by one or more radial protrusions 47 extending away from the bushing wall. As illustrated in FIGS. 4A and 4B, each leaf spring 41 may be provided with a radial protrusion 47 that extends radially outwardly, away from the wall 45 of bushing 40, in a generally perpendicular direction. As previously discussed, the radially-extending flange 43 may be used to secure the bushing 40 within the steering assembly. Although disclosed as a plurality of radial protrusions 47, radial flange 43 may be made up of a single protrusion, and may extend fully around or partially around bushing 40.

The first axial end of the bushing 40 may also include axial slots 44 extending along a length of the bushing 40 in an axial direction toward a second end of the bushing. The axial slots 44 may be located between adjacent radial protrusions 47 of the radial flange 43, and in an exemplary embodiment, the axial slots 44 do not extend entirely through the bushing wall in the axial direction. The axial slots 44 may permit additional flexure of the bushing wall, which may be desirable during installation of the bushing 40, or when load is applied to the bushing 40 during use. Additionally or alternatively, axial slots may not be provided or axial slots may be formed through radial flange 43 in an embodiment in which radial flange is a single piece that extends around a circumference of bushing 40. In addition, the axial slots 44 may facilitate the independent flexure of one leaf spring 41 relative to another leaf spring 41. That is, the particular pattern and position of the axial slots may permit each leaf spring 41 to move and function independently of other leaf springs 41 in the bushing 40. This particular construction allows the bushing 40 to be self-aligning (self-centering) and to permit relative movement of between the steering gear rack and the steering gear housing in a diametrical dimension.

Additionally, as described above with respect to the exemplary embodiment of FIGS. 2A-2B and 3A-3B, an axial gap (not shown) may be formed when the axial ends of the bushing wall 45 are positioned adjacent or near to one another. In particular, due to an exemplary manufacturing process in which the bushing is formed in an initial, generally planar (or flat) shape, when the generally planar shape is formed into a circumferential and/or annular shape, an axial gap (not shown) is formed when the axial ends of the bushing wall 45 are positioned adjacent or near to one another. Additionally and/or alternatively, it is possible to connect the ends of the bushing wall to one another during installation, or the bushing may be formed by another process such that the bushing is annular in shape and an axial gap is not provided.

Figure 5:
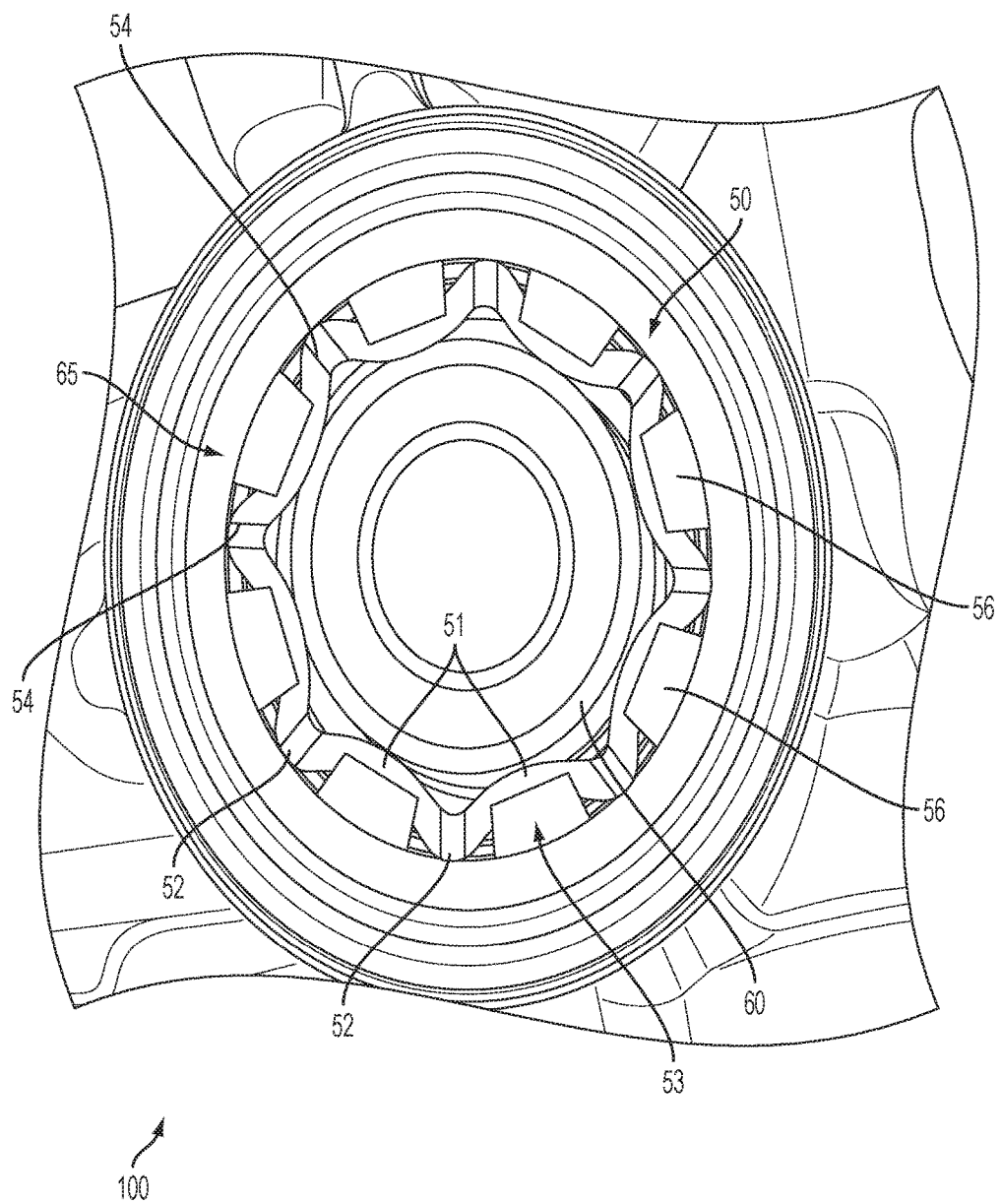
FIG. 5 shows the bushing of FIGS. 4A and 4B assembled between inner and outer concentric elements.

FIG. 5 illustrates an exemplary embodiment of an assembly 100 including a bushing 50, which may take the form of any of the bushings 10, 20, 30, or 40 discussed above with regard to FIGS. 1A-4B. It is also within the scope of the present disclosure to provide a bushing having a combination features from any of the various embodiments. While the bushing 50 of the exemplary embodiment is similar to the bushing 40 shown in FIGS. 4A-4B, it is understood that this illustration is intended to be exemplary only and that any of the disclosed bushing embodiments may be used in the the assembly 100.

As shown in FIG. 5, bushing 50 may include a plurality of leaf springs 51, which are able to move radially with respect to one another, and with respect to a central axis of the bushing 50. Radial deflection of each leaf spring 51 may cause a resilient response, as noted above in the disclosure of each of the exemplary bushing embodiments.

The bushing 50, in accordance with the present disclosure, may include a radial flange 53, which may be formed by a plurality of radial protrusions 56 at a first end of the bushing 50. Between adjacent protrusions of the radial flange 53 in the exemplary embodiment, the bushing 50 may include axial slots 54, which extend along a portion of a length of the bushing 50, from the first end of the bushing 50 toward a second end of the bushing 50. The axial slots 54 and the flange 53 being formed in multiple parts may improve radial deflection of the leaf springs 52, due to the reduced constraints on radial movement of nearby bushing wall portions.

In the steering assembly 100, the bushing 50 may be located between a steering gear rack 60 and a steering gear housing 65, or similar concentric assembly elements. During assembly, if the bushing 50 was molded flat, the bushing 50 may be wrapped around the steering gear rack 60 or otherwise placed into a generally annular configuration (e.g., rolled into a cylindrical form and placed into the housing). Leaf springs 51, which form portions of the bushing wall, may extend inwardly to make contact with the steering gear rack 60, while intermediate or connecting wall portions 52, in the form of hinge elements, of the bushing wall may extend outwardly to make contact with the steering gear housing 65. The configuration of the leaf springs 51 may allow the bushing 50 to adjust dynamically to differences in diameters, or changes in loading conditions, in the assembly, based on radial loads applied to the bushing 50 by one or both of the steering gear rack 60 and housing 65. Either of the steering gear rack 60 or housing 65 in the exemplary may include a circumferential groove into which the radial flange 53 of the bushing may be inserted, in order to retain a relative axial position of the bushing with respect to the steering gear rack 60 and/or housing 65 during installation and use.

In accordance with one aspect of the present disclosure, a bushing as disclosed herein may be made by a simple manufacturing process. In particular, the design of a bushing in accordance with the present teachings enables a manufacturing process in which the bushing can be molded flat with a simple die draw. In such a process, there is no need for a complex and costly slide process. Additionally and/or alternatively, it is possible that a bushing in accordance with the present teachings may be manufactured by conventional processes such that the bushing is molded in its final installed configuration (i.e., in an annular shape).

Although the bushing of the present disclosure has been discussed with regard to use in a steering assembly, its use is not so limited and one skilled in the art will appreciate the various applications for which the disclosed bushing may be used. While the present disclosure have been disclosed in terms of exemplary embodiments in order to facilitate a better understanding, it should be appreciated that the present disclosure can be embodied in various ways without departing from the scope thereof. Therefore, the present disclosure should be understood to include all possible embodiments which can be achieved without departing from the scope of the recited subject matter as set forth in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the recited subject matter. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its disclosure. Other embodiments of the disclosure will be apparent to those skilled in the art from consideration of the specification and practice of the disclosure herein. It is intended that the specification and embodiments described herein be considered as exemplary only.

What is claimed is:

1. A bushing, comprising:
a single wall; and
a plurality of leaf springs coupled to one another, each of the plurality of leaf springs forming an inner contact face of the bushing configured to contact a steering gear and an outer contact face of the bushing configured to contact a steering gear housing, wherein the wall is configured to be positioned in an annular shape such that the inner and outer contact faces form at least a portion of an inner surface and an outer surface of the annular shape, respectively.

2. The bushing of claim 1, wherein each of the plurality of leaf springs is directly coupled to at least one adjacent leaf spring of the plurality of leaf springs.

3. The bushing of claim 1, wherein each of the plurality of leaf springs is coupled to an adjacent leaf spring of the plurality of leaf springs through intermediary wall portions.

4. The bushing of claim 1, wherein each of the plurality of leaf springs is independently radially movable inwardly or outwardly with respect to a longitudinal axis of the annular shape.

5. The bushing of claim 4, further comprising a flange, the flange configured to radially extend from the wall when the wall is in the annular shape.

6. The bushing of claim 5, wherein the flange comprises a plurality of protrusions, and each protrusion of the plurality of protrusions is associated with a respective leaf spring of the plurality of leaf springs.

7. The bushing of claim 1, further comprising at least one axial slot extending partly along a length of the bushing from a first axial end of the bushing toward a second axial end of the bushing and circumferentially separating adjacent leaf springs of the plurality of leaf springs.

8. The bushing of claim 7, wherein the at least one axial slot comprises a plurality of axial slots.

9. The bushing of claim 1, wherein the bushing comprises a unitary structure.

10. The bushing of claim 1, wherein the bushing is made of a material comprising a thermoplastic.

11. The bushing of claim 10, wherein the material of the bushing further comprises at least one reinforcing fiber selected from a group consisting of synthetic fibers and carbon fibers.

12. The bushing of claim 1, wherein the wall comprises a first free end and a second free end, and the first and second free ends are positioned adjacent to one another in the annular shape.

13. The bushing of claim 1, wherein each of the leaf springs is radially deflectable relative to and independent of each of the others of the plurality of leaf springs to self-align the bushing.

14. The bushing of claim 1, wherein adjacent leaf springs are separated from one another by a slot formed in the wall along a portion of an axial length of each leaf spring.

15. A steering gear assembly, comprising:
a steering gear housing;
a steering gear rack positioned at least partially within the steering gear housing; and
a bushing, comprising:
a plurality of leaf springs coupled to one another to form a bushing wall, wherein each of the leaf springs are deflectable relative to the plurality of leaf springs to self-align the bushing,
the bushing being positioned between the housing and the rack such that each of the plurality of leaf springs is at least partially in contact with an interior surface of the housing and an exterior surface of the rack.

16. The steering gear assembly of claim 15, wherein each of the plurality of leaf springs is coupled to at least one adjacent leaf spring via a hinge portion.

17. The steering gear assembly of claim 16, wherein the bushing wall is configured to be positioned in an annular shape such that first and second free ends of the wall are positioned substantially adjacent to one another, and wherein each of the plurality of leaf springs is radially movable with respect to a longitudinal axis of the annular shape.

18. The steering gear assembly of claim 15, further comprising a flange radially extending from the bushing wall toward the steering gear housing or the steering gear rack.

19. The steering gear assembly of claim 18, wherein the flange comprises a plurality of protrusions, each protrusion being associated with a respective leaf spring of the plurality of leaf springs.

20. The steering gear assembly of claim 18, further comprising at least one axial slot extending from a first axial end of the bushing toward a second axial end of the bushing.

21. The steering gear assembly of claim 20, wherein the at least one axial slot includes a plurality of axial slots.

22. The steering gear assembly of claim 21, wherein a surface of the steering gear housing comprises an annular groove in which the flange is seated in an assembled condition to restrict relative axial movement between the housing and the bushing, and further wherein the plurality of axial slots allows the first axial end of the bushing to compress inwardly when the bushing is inserted into the housing before the flange extends into the annular groove.

23. The steering gear assembly of claim 15, wherein the bushing comprises a unitary structure.

24. The steering gear assembly of claim 15, wherein the bushing is made of a material comprising a thermoplastic.

25. The steering gear assembly of claim 24, wherein material of the bushing further comprises at least one reinforcing fiber selected from a group consisting of synthetic fibers and carbon fibers.

26. A bushing, consisting essentially of:
a plurality of leaf springs coupled to one another to form opposing steering-gear and steering-gear-housing contact surfaces of the bushing,
wherein the bushing is movable between a planar configuration and a cylindrical configuration, and
wherein each of the plurality of leaf springs is independently radially movable relative to other leaf springs of the plurality of leaf springs and to a longitudinal axis of the cylindrical configuration of the bushing.

27. The bushing of claim 26, further comprising a flange that extends substantially perpendicularly from the plurality of leaf springs when the bushing is in the planar configuration and wherein the flange extends radially outwardly from the plurality of leaf springs when the bushing is in the annular configuration.

28. The bushing of claim 27, wherein the flange comprises a plurality of protrusions, and each protrusion of the plurality of protrusions is associated with a respective leaf spring of the plurality of leaf springs.

29. The bushing of claim 28, further comprising a plurality of axial slots extending from a first axial end of the bushing toward a second axial end of the bushing, wherein each slot of the plurality of axial slots is located between adjacent protrusions of the plurality of protrusions.

30. A method of assembling a steering gear assembly, comprising:
positioning a bushing between and in contact with a steering gear housing and a steering gear rack, wherein positioning comprises moving a single wall forming the bushing between a planar configuration in which free ends of the wall are spaced away from one another along a longitudinal axis, and an annular configuration in which the free ends of the wall are positioned adjacent one another.

31. The method of claim 30, wherein positioning further comprises wrapping the bushing wall around the steering gear rack.

32. The method of claim 30, wherein the bushing comprises a flange and the steering gear housing comprises an annular groove, and further wherein positioning includes positioning the flange in the annular groove.

33. The method of claim 30, wherein positioning includes inserting the bushing into the housing prior to installing the steering rack.

34. The method of claim 33, wherein positioning further includes forming the wall of the bushing into the annular configuration prior to inserting the bushing into the housing.

35. The method of claim 33, wherein the wall of the bushing comprises a plurality of leaf springs coupled to one another, and wherein each leaf spring is deflectable to self-align the steering gear housing and the steering gear rack, and wherein positioning further comprises deflecting one or more of the plurality of leaf springs through contact with the steering gear housing and the steering gear rack to align the bushing between the steering gear housing and the steering gear rack.

36. The method of claim 30, wherein positioning includes wrapping the wall of the bushing around the steering rack prior to insertion into the housing.

\* \* \* \* \*